(12) United States Patent
Wood et al.

(10) Patent No.: US 12,545,388 B2
(45) Date of Patent: Feb. 10, 2026

(54) STEERING SYSTEM WITH TWIN ACTUATORS AND TIE BAR

(71) Applicant: Marine Canada Acquisition Inc., Richmond (CA)

(72) Inventors: Neal Wood, Coquitlam (CA); Geoffrey David Duddridge, Nanaimo (CA)

(73) Assignee: Dometic Marine Canada Inc., Richmond (CA)

( * ) Notice: Subject to any disclaimer, the term of this patent is extended or adjusted under 35 U.S.C. 154(b) by 617 days.

(21) Appl. No.: 17/983,030

(22) Filed: Nov. 8, 2022

(65) Prior Publication Data

US 2023/0166823 A1 Jun. 1, 2023

Related U.S. Application Data

(60) Provisional application No. 63/283,732, filed on Nov. 29, 2021.

(51) Int. Cl.
| | |
|---|---|
| *B63H 20/12* | (2006.01) |
| *B63H 20/00* | (2006.01) |
| *B63H 25/06* | (2006.01) |
| *B63H 25/12* | (2006.01) |

(52) U.S. Cl.
CPC ............ *B63H 20/12* (2013.01); *B63H 25/12* (2013.01); *B63H 2020/003* (2013.01); *B63H 2025/066* (2013.01)

(58) Field of Classification Search
CPC .. B63H 20/12; B63H 25/12; B63H 2020/003; B63H 2025/066
See application file for complete search history.

(56) References Cited

U.S. PATENT DOCUMENTS

| | | | |
|---|---|---|---|
| 7,267,588 B1* | 9/2007 | Griffiths | B63H 20/12 440/63 |
| 2019/0118922 A1* | 4/2019 | Mcginley | B63H 25/42 |
| 2019/0308710 A1* | 10/2019 | Gai | B63H 20/001 |

* cited by examiner

*Primary Examiner* — Stephen P Avila
(74) *Attorney, Agent, or Firm* — CALDERON SAFRAN & WRIGHT P.C.

(57) ABSTRACT

A steering system for a marine vessel, the steering system comprises a first steering apparatus having a first steering actuator for steering the first steering apparatus and a second steering apparatus having a second steering actuator for steering the second steering apparatus. There is a mechanical steering linkage operatively connecting the first steering apparatus to the second steering apparatus so the steering apparatuses are steered synchronously. A user input device provides user inputted steering commands. A control apparatus operatively connects to the actuators and to the user input device. The control apparatus controls the steering of the steering apparatuses so both of the steering apparatuses are simultaneously steered the same amount.

20 Claims, 6 Drawing Sheets

STEERING SYSTEM WITH TWIN ACTUATORS AND TIE BAR

REFERENCE TO RELATED APPLICATION

The present invention claims the priority of U.S. Provisional Patent Application No. 63/283,732, filed Nov. 29, 2021, which is incorporated herein.

TECHNICAL FIELD

The present disclosure relates to marine steering systems and, in particular, to marine steering systems using electronic helms and multiple outboard motors or multiple rudders.

BACKGROUND

Electronic steering systems have become increasingly common in smaller marine vessels. However many such marine vessels retain hydraulic steering actuators which are operatively connected to one or more steering apparatuses such as outboard motors, sterndrives or rudders.

One particular application relates to marine vessels with at least two outboard motors, two sterndrives or two rudders. There is a need for an improved steering system for such applications. One proposal has been to use two separate hydraulic systems, each having a hydraulic pump and a hydraulic actuator having an electronic sensor for providing feedback on the position of each actuator. One actuator is operatively connected to each of the steering apparatuses, such as an outboard motor. Each pump would be driven based on feedback from its own actuator. The problem with such a system is there is no load sharing as well as difficulties when using counterrotating propellers.

Another possibility is using two hydraulic pumps, two smart cylinders and connecting the two hydraulic systems together in parallel such that the flows from the two pumps are combined. The problem was such an arrangement is that both systems fail if there is a single point of failure, such as failure of a hydraulic hose.

Another suggestion is to use a larger pump instead of the two pumps utilized in the previous possibility. Again this has the disadvantage of a potential single point of failure crippling both systems.

SUMMARY

It is an object of the present invention to provide an improved steering system for marine craft utilizing electronic steering in combination with a plurality of steering actuators.

Accordingly there is provided a steering system for a marine vessel. The steering system comprises a first steering apparatus having a first steering actuator for steering the first steering apparatus and a second steering apparatus having a second steering actuator for steering the second steering apparatus. There is a mechanical steering linkage operatively connecting the first steering apparatus to the second steering apparatus so the steering apparatuses are steered synchronously. An input device provides user inputted steering commands. A control apparatus operatively connects to the actuators and to the input device. The control apparatus controls the steering of the steering apparatuses so both of the steering apparatuses are simultaneously steered the same amount.

In one embodiment the actuators are hydraulic actuators and there are independent hydraulic systems which supply pressurized hydraulic fluid to each of the hydraulic actuators. In another embodiment the actuators are electric actuators and electrical systems supply electric current to the electric actuators.

There is provided, according to another aspect of the invention, a steering system for a marine vessel having two movable steering apparatuses. The steering system comprises a first movable steering apparatus having a first hydraulic steering actuator for steering the first movable steering apparatus. The first hydraulic system includes a first hydraulic pump for supplying pressurized hydraulic fluid to the first steering actuator. A second movable steering apparatus has a second hydraulic steering actuator for steering the second movable steering apparatus. A second hydraulic system has a second hydraulic pump for supplying pressurized hydraulic fluid to the second steering actuator. The second hydraulic system is hydraulically independent of the first hydraulic system. An electronic pump control apparatus controls hydraulic fluid output of the first hydraulic pump and hydraulic fluid output of the second hydraulic pump. A mechanical steering linkage operatively connects the first steering apparatus to the second steering apparatus so the steering apparatuses are steered synchronously and one of the hydraulic systems is capable of steering both movable steering apparatuses where one of the hydraulic systems fails.

The movable steering apparatuses may each comprise an outboard motor, a rudder or a sterndrive.

There is also provided a method of steering a marine vessel having a first steering apparatus with a first steering actuator for steering the first steering apparatus, a second steering apparatus having a second steering actuator for steering the second steering apparatus and a control apparatus. The method comprises operatively connecting the first steering apparatus to the second steering apparatus with a mechanical steering linkage so the steering apparatuses are steered synchronously. A steering angle setpoint is provided to the control apparatus. The same control command is provided for both steering actuators from the control apparatus, whereby both of the actuators are steered the same amount.

In one embodiment steering angle feedback is sent to the control apparatus from a sensor on one of the steering apparatuses. A sensor from another steering apparatus can be used in the event of failure.

DESCRIPTION OF PREFERRED EMBODIMENT(S)

Figure 1:
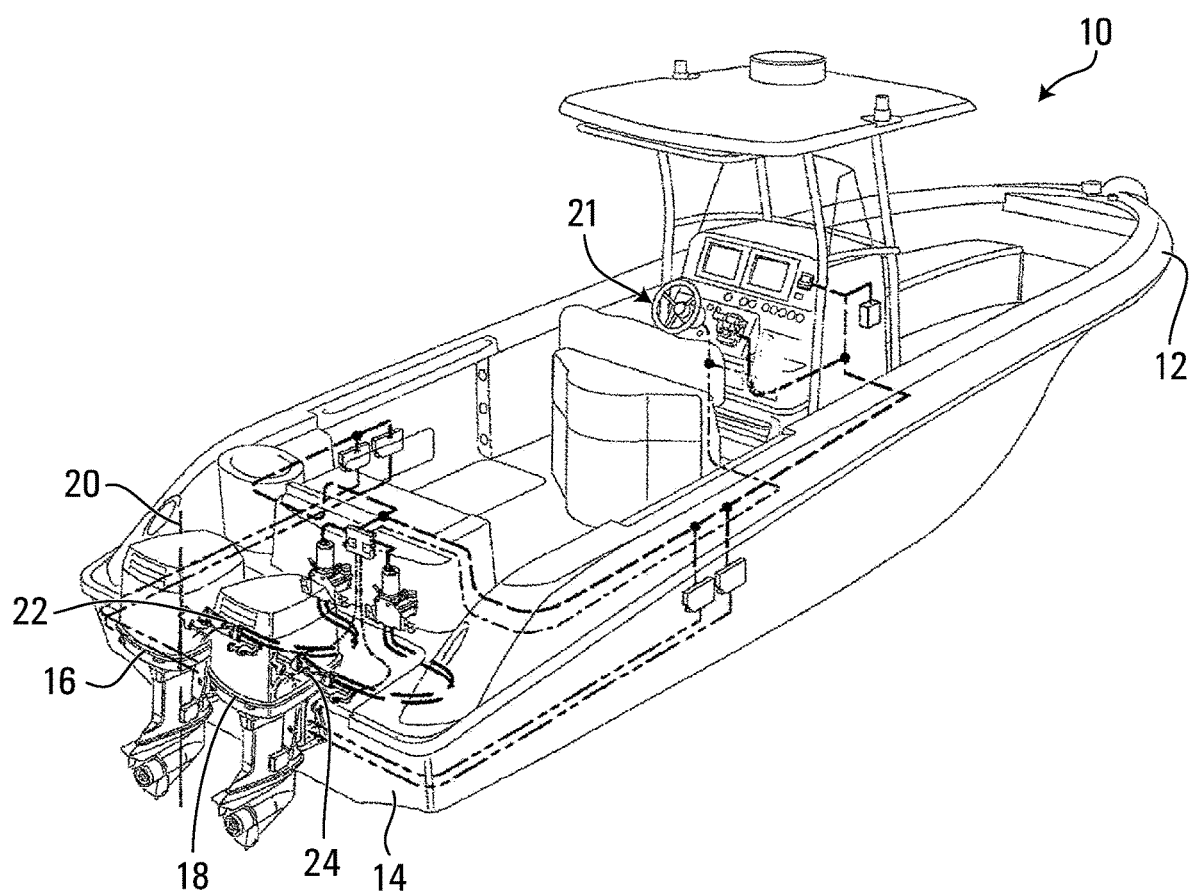
FIG. 1 is a perspective view of a marine vessel equipped with a single electronic helm and two outboard motors and including a steering system according to an embodiment of the invention.
Figure 2:
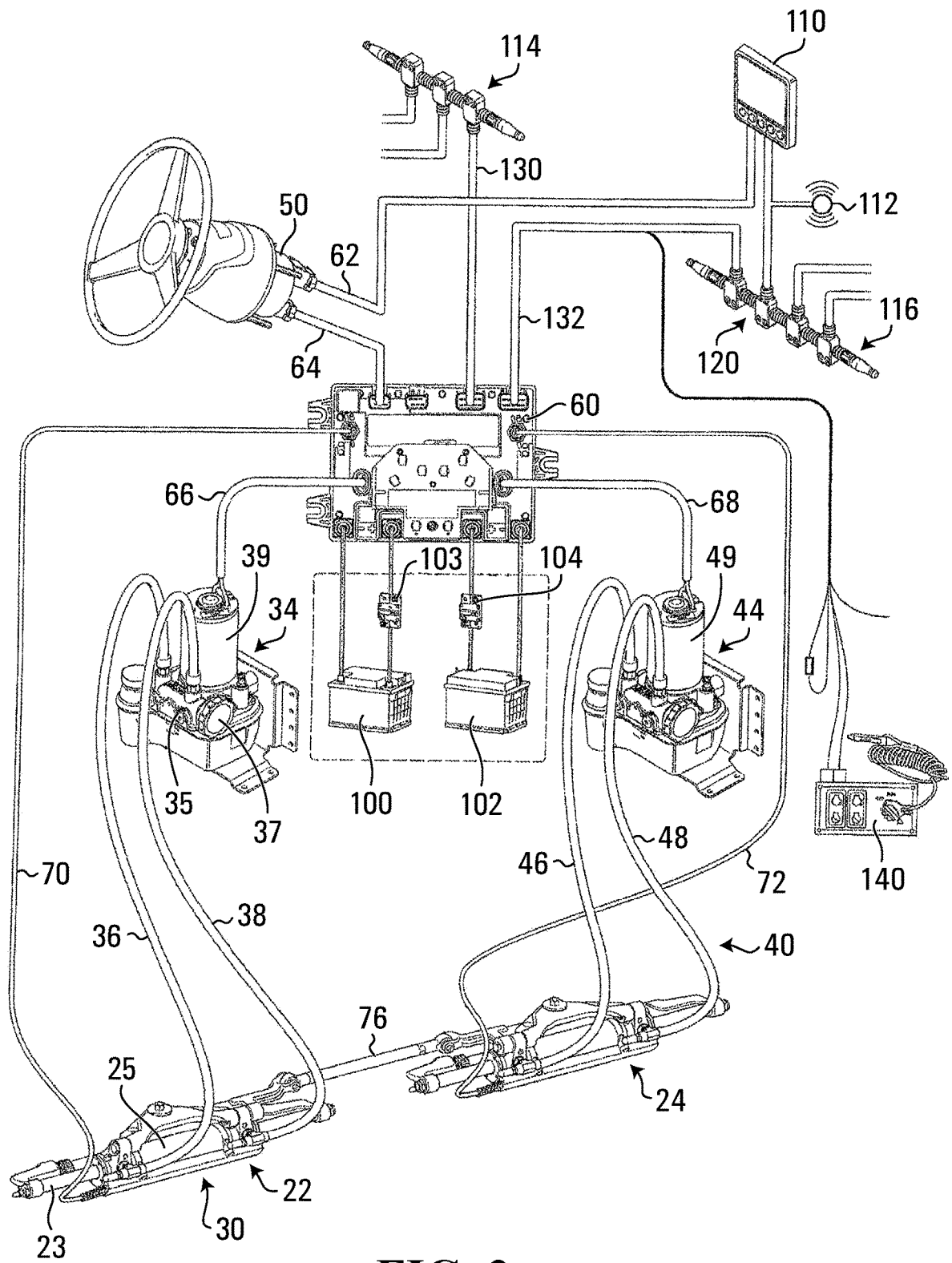
FIG. 2 is a partially schematic, perspective view of a steering system for the vessel of FIG. 1 and using two hydraulic steering actuators mechanically coupled by a tie bar.

Referring to the drawings and first to FIGS. 1 and 2, there is shown a marine vessel 10 of the type typically used as a pleasure craft or fishing vessel. The vessel 10 has a hull 12 with a stern 14 fitted with two outboard motors 16 and 18, each of which serves as a movable steering apparatus for the vessel as well as propulsion units for the vessel in the well-known manner. Each of the outboard motors is rotatable about a steering axis in order to steer the vessel, for example steering axis 20 for motor 16.

There is a steering system 21 capable of steering motors 16 and 18. The steering system has a separate hydraulic steering actuator for each motor, actuator 22 for motor 16 and actuator 24 for motor 18. Each actuator in this example has a sensor 99, shown in FIG. 6, which is capable of sensing the position of the cylinder rod, for example the cylinder rod 23 of actuator 22 relative to its cylinder 25. Such actuators are known and available as SmartCylinders™ from Marine Canada Acquisition Inc. of Richmond, British Columbia, Canada.

As seen in FIG. 2 there is a first hydraulic system 30 which includes the actuator 22 which is operatively connected to the outboard motor 16, shown in FIG. 1, which serves as a steering apparatus for the vessel 10. Movement of actuator 22 causes steering of the first steering apparatus in the form of motor 16. The system 30 also includes a first hydraulic pump 34 which is hydraulically connected to actuator 22 via hydraulic lines or hoses 36 and 38. Thus the system 30 acts as an energy supply system which supplies energy in the form of pressurized hydraulic fluid to the actuator 22. In the known manner, the pump can supply pressurized hydraulic fluid through hose 36 to the left end of cylinder 22, from the point of view of FIG. 2, thus causing the cylinder rod to move to the right and rotate motor 16 clockwise as seen from above. Likewise, the pump can supply hydraulic fluid through the hose 38 to the right end of the cylinder, causing the motor to rotate counterclockwise.

The steering system has a second hydraulic system 40 which includes steering actuator 24 operatively connected to motor 18 which serves as a second steering apparatus. The second hydraulic system includes a second hydraulic pump 44 which supplies pressurized hydraulic fluid to the actuator 24 through hydraulic hoses 46 and 48. The second hydraulic system 40 steers motor 18 in the same manner as system 30 steers motor 16. Accordingly the operation of system 40 will not be described in more detail.

It may be observed from FIG. 2 that the second hydraulic system 40 is hydraulically independent of the first hydraulic system 30. In other words, each of the hydraulic systems is hydraulically isolated from the other and there are no hydraulic connections extending therebetween. Accordingly, any failure or weakness in one of the hydraulic systems does not affect the other.

The steering system 21 also includes an electronic aspect including a user input device for user inputted steering commands in the form of an electronic helm 50 operatively connected to pump control apparatus 60 via electric cable 64. The electronic helm and control apparatus 60 are known in the prior art and again are available from Marine Canada Acquisition Inc. discussed above. In other embodiments the user may input the desired degree of steering with other types of input devices such as levers.

There are electrical cables 66 and 68 which operatively connect control apparatus 60 to motors 39 and 49 of respective pumps 34 and 44 whereby operation of the pumps is controlled by control apparatus 60. There are also cables 70 and 72 which operatively connect actuators 22 and 24 to the control apparatus thereby providing feedback to the control apparatus on the actual positions of the rods of the actuators relative to their cylinders and accordingly the rotational positions of the outboard motors respectively. This provides closed loop control for the steering of the vessel.

Figure 6:
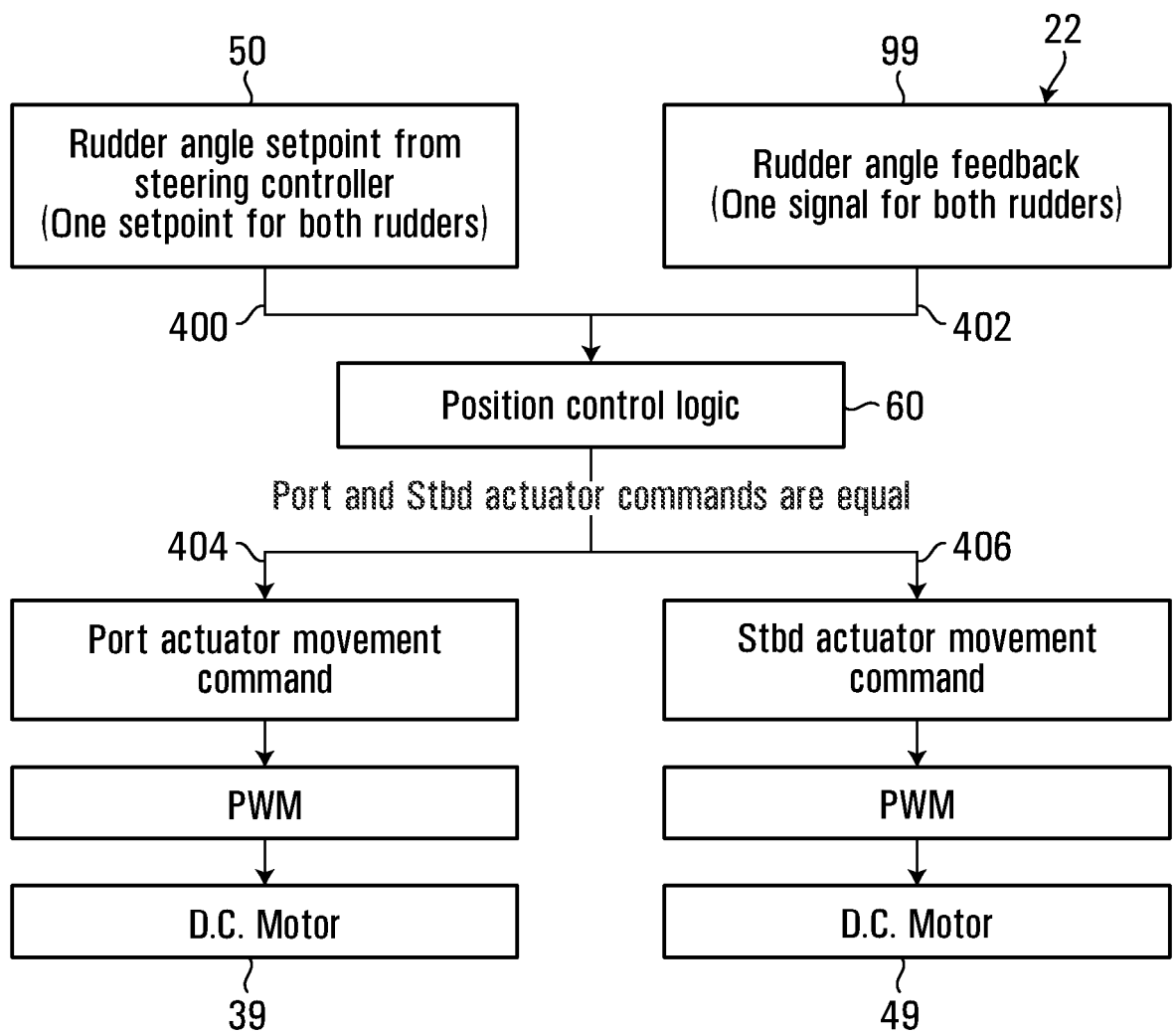
FIG. 6 is a flowchart showing a method of steering a twin rudder or twin outboard marine vessel.

The feedback for steering system 21 is normally provided only by actuator 22 via cable 70 and control apparatus 60 provides signals to both of the hydraulic pumps based on feedback from this actuator only which helps ensure that the actuators move synchronously. This is accomplished when both of the hydraulic pumps provide the same fluid output to their respective actuators. Alternatively controller 60 could receive feedback signals from actuator 24 via cable 72 in the event of failure of some component which inhibits the apparatus 60 from receiving signals from actuator 22. A further alternative is that the control apparatus could control the output of both pumps 34 and 44 based on an average reading from both actuators 22 and 24. In this example the fluid output is controlled by varying the speed of electric motors 39 and 49 for pumps 34 and 44 respectively. These are DC motors in this example and are controlled by pulse width modulation as shown in FIG. 6.

There is a mechanical connection in this example between actuators 22 and 24 in the form of a tie bar 76 which mechanically couples the actuators 22 and 24 together, therefore ensuring that the motors 16 and 18 are steered synchronously. However, if the tie bar 76 fails, then the control apparatus 60 ensures that the steering of the two outboard motors is generally synchronous. In alternative embodiments other mechanical connections could be substituted for the tie bar such as gears for interconnecting the actuators for the outboard motors themselves.

In the illustrated embodiment the hydraulic components for steering each of the outboard motors 16 and 18 are substantially the same including pumps 34 and 44 and actuators 22 and 24 as are the outboard motors themselves. In this way, both outboard motors provide the same degree of steering when the respective pumps receive the same signal from controller 60. In other embodiments different components could be substituted provided they are functionally similar or adjustments are made to the operation of the controller or to the geometry of the connections between the actuators and the outboard motors.

Each of the pumps is equipped with a bypass valve, for example bypass valve 35 of pump 34. The bypass valve 35 can be opened by rotating knob 37 in the event that pumps 34 fails. In this way, for example, the vessel can be steered solely by actuator 24 without actuator 22 resisting.

A pair of batteries 100 and 102, equipped with breakers 103 and 104, provide electrical power to the pump control apparatus 60. There is also a display 110 connected to the helm by cable 62. A buzzer 112 can signal a system fault.

Network connections 114 and 116 show how the control apparatus 60 is connected to a CAN bus 120 in this example via cables 130 and 132.

An ignition system 140 is also illustrated.

Figure 3:
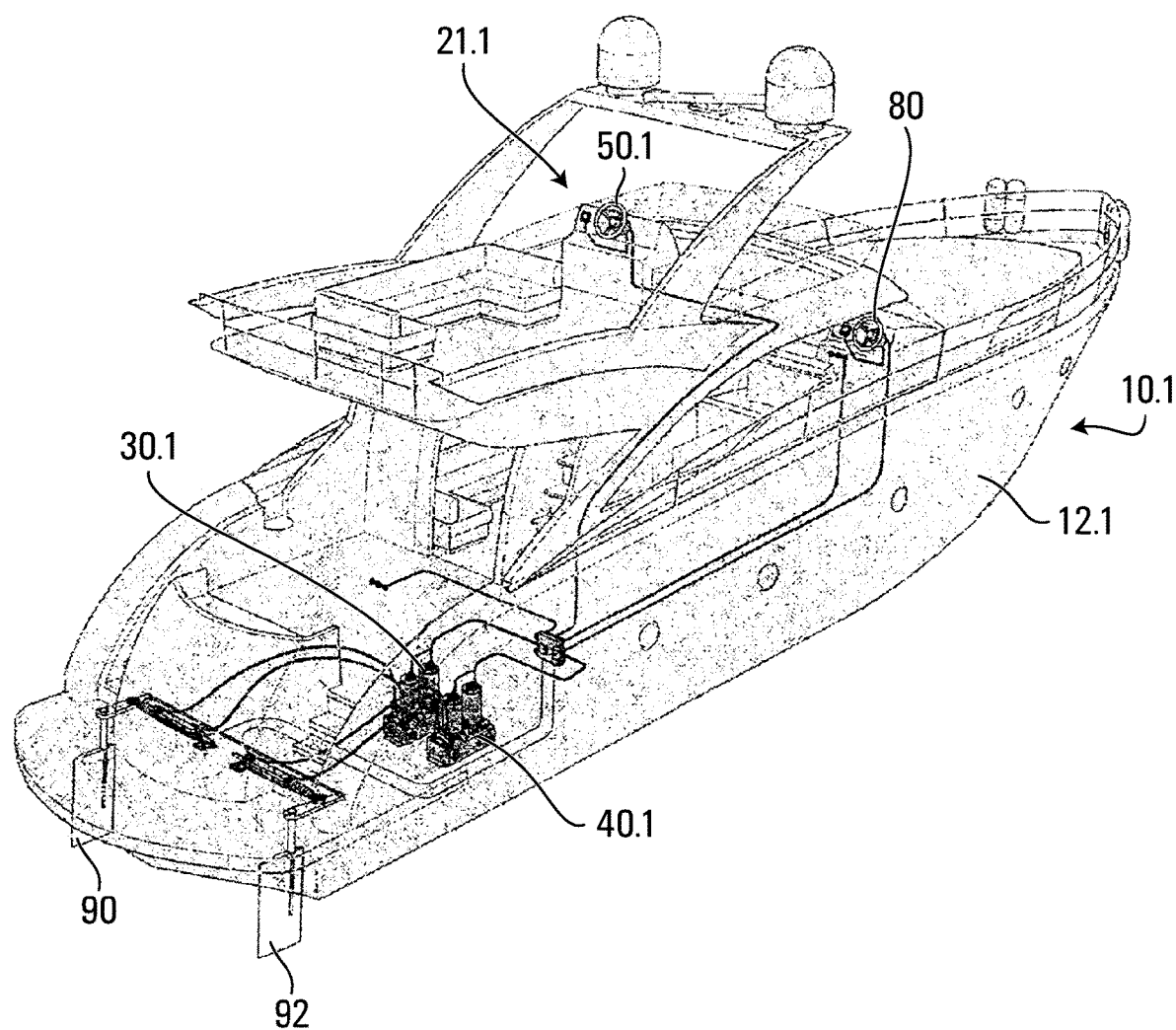
FIG. 3 is a perspective view similar to FIG. 1 of another marine vessel equipped with two electronic helms and two rudders.
Figure 4:
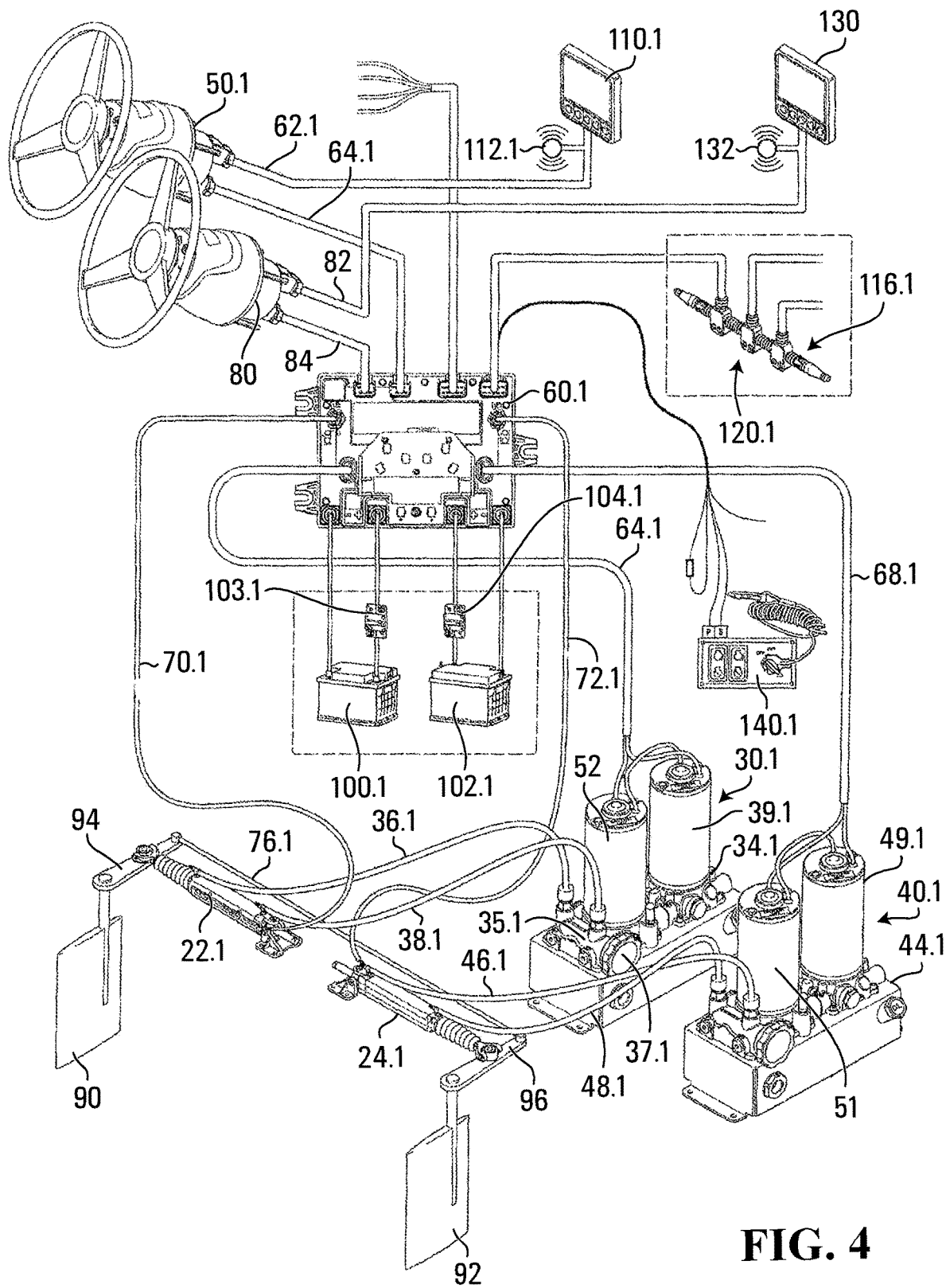
FIG. 4 is a partially schematic view of a steering system for the vessel of FIG. 3 and using two hydraulic steering actuators with the two rudders mechanically coupled by a tie bar.

An alternative embodiment is shown in FIGS. 3 and 4 where like parts have like numbers with the additional designation ".1". In this example the vessel 10.1 has an inboard engine (not shown) and twin helms including helm 50.1 and a second helm 80 which is similar to helm 50.1. Cable 84 connects the helm 80 to controller 60.1. There is also an additional display 130 and an additional buzzer 132 for the second helm 80. The vessel can be steered from either helm. Also in this example vessel 10.1 is provided with rudders 90 and 92 which are steered via the steering arms 94 and 96 respectively. The actuators 22.1 and 24.1 are connected to the rudders via the steering arms. The rudders serve as steering apparatuses in this example. In other examples the steering apparatuses could be such things as stern drives or steerable nozzles for jet boats. Otherwise the embodiment of FIGS. 3 and 4 is similar to that of FIGS. 1 and 2 including the provision of having two independent hydraulic systems 30.1 and 40.1.

Other variations are possible and the invention is also applicable to marine vessels having three or more outboard engines or other movable steering apparatuses which are similarly steered by independent hydraulic systems and/or a suitable number of tie bars.

Figure 5:
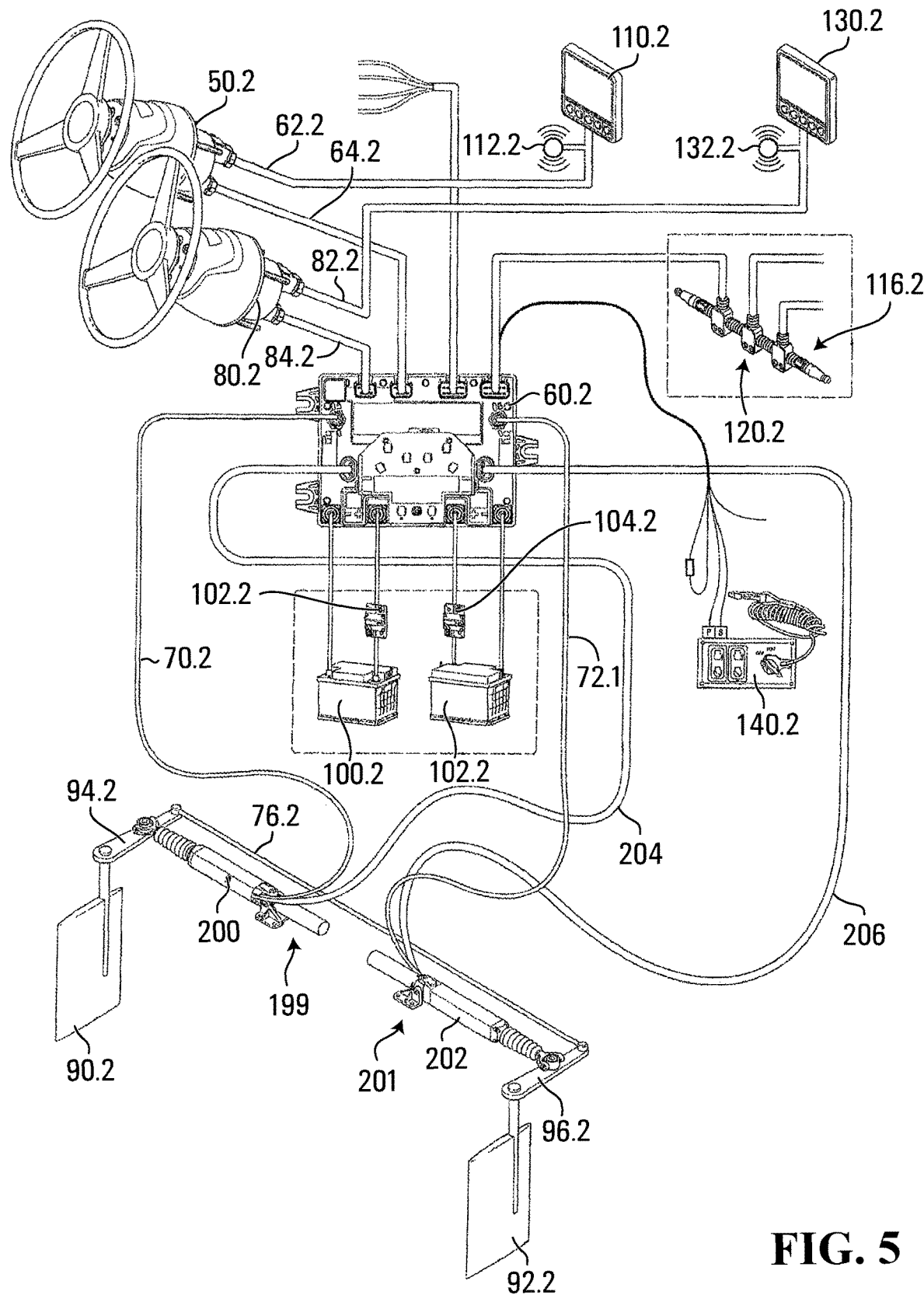
FIG. 5 is a schematic diagram of a steering system for a vessel similar to that of FIG. 3, but utilizing two electric steering actuators and with the two rudders mechanically coupled by a tie bar.

Also the invention is applicable to other types of actuators such as electric actuators shown in the embodiment of FIG. 5. In this embodiment components like those in FIGS. 1 and 2 have like numbers with the addition of ".2". Components like those in FIGS. 3 and 4, but not found in the embodiment of FIGS. 1 and 2, have the same numbers as in FIGS. 3 and 4 with the addition of ".2". The electrical systems 199 and 201 for electric actuators 200 and 202 are separate in a manner similar to the hydraulic systems discussed above. In the case of electric actuators the hydraulic components are not required as the controller is coupled directly to the actuators 200 and 202 by cables 204 and 206 respectively which provide power to the actuators to steer the rudders 90.2 and 92.2. Electric actuators could also be used with outboard motors, replacing the hydraulic actuators of FIGS. 1 and 2

FIG. 6 shows a method of steering a marine vessel with twin rudders or twin outboard motors employing the steering systems shown above. A rudder angle setpoint signal 400 is sent to the position control logic of the control apparatus 60 from helm 50. Rudder angle feedback 402 is sent to the control apparatus from the sensor 99 of actuator 22. The control apparatus provides identical commands 404 and 406 to the hydraulic pumps 34 and 44 respectively, thus moving the actuators 22 and 24 the same amount and thereby steering the outboard motors 16 and 18 the same amount. As stated previously, the commands are in the form of pulse width modulation (PWM) of DC motors 39 and 49 for the pumps 34 and 44 respectively.

The steering system disclosed with respect to each of the embodiments above overcomes the problems associated with lack of load sharing in typical prior art installations. The system shares the loads equally between the two hydraulic systems, for example hydraulic systems 30 and 40 shown in FIG. 2, by physically connecting the movable steerable apparatuses, outboard motors in this example, and providing the same outputs to the pumps 34 and 44. Therefore the steering force of each of the steering actuators, in this example outboard motors 16 and 18, is the same.

It will be understood by a person skilled in the art that many of the details provided above are by way of example only, and are not intended to limit the scope of the invention which is to be determined with reference to the following claims.

What is claimed is:

1. A steering system for a marine vessel, the steering system comprising:
   a first steering apparatus having a first steering actuator for steering the first steering apparatus;
   a second steering apparatus having a second steering actuator for steering the second steering apparatus;
   an input device configured to provide user-inputted steering commands;
   a position sensor on the first steering apparatus configured to indicate a steering position of the first steering apparatus; and
   a control apparatus operatively connected to the first and second steering actuators, to the input device, and to the position sensor, the control apparatus configured to control the steering of the first and second steering apparatuses so the first and second steering apparatuses are simultaneously steered the same amount in response to the user-inputted steering commands and in response to feedback from the position sensor indicating the steering position of the first steering apparatus.

2. The steering system of claim 1, further comprising a mechanical steering linkage operatively connecting the first steering apparatus to the second steering apparatus so the first and second steering apparatuses maintain synchronicity.

3. The steering system of claim 1, wherein the steering are the first steering actuator is a first hydraulic steering actuator, the second steering actuator is a second hydraulic steering actuator, and the control apparatus is configured to cause a first hydraulic pump to provide pressurized hydraulic fluid to the first hydraulic steering actuator via a first hydraulic system and to cause a second hydraulic pump to provide simultaneously pressurized hydraulic fluid to the second hydraulic steering actuator via a second hydraulic system, the first hydraulic system being hydraulically independent of the second hydraulic system.

4. A steering system for a marine vessel, the steering system comprising:
   a first steering apparatus having a first steering actuator for steering the first steering apparatus;
   a second steering apparatus having a second steering actuator for steering the second steering apparatus;
   an input device configured to provide user-inputted steering commands;
   a control apparatus operatively connected to the first and second steering actuators and to the input device, the control apparatus configured to control the steering of the first and second steering apparatuses so the first and second steering apparatuses are simultaneously steered the same amount; and
   a position sensor on the first steering apparatus and configured to indicate a steering position of the first steering apparatus, the position sensor being operatively connected to the control apparatus to provide feedback and thereby control the steering of the first and second steering apparatuses;
   wherein the first steering actuator is a first hydraulic steering actuator, the second steering actuator is a second hydraulic steering actuator, and the control apparatus is configured to cause a first hydraulic pump to provide pressurized hydraulic fluid to the first hydraulic steering actuator via a first hydraulic system and to cause a second hydraulic pump to provide simultaneously pressurized hydraulic fluid to the second hydraulic steering actuator via a second hydraulic system, the first hydraulic system being hydraulically independent of the second hydraulic system; and wherein the first hydraulic pump has a first DC electric motor, the second hydraulic pump has a second DC electric motor, and the control apparatus is configured to control the first and second hydraulic pumps via pulse width modulation of power supplied to the first and second DC electric motors.

5. The steering system of claim 3, wherein the control apparatus is configured to control the first and second hydraulic pumps so an output of the pressurized hydraulic fluid to the first and second hydraulic pumps is the same.

6. The steering system of claim 1, wherein the second steering apparatus is operatively connected to the control apparatus and configured to provide feedback to the control apparatus in the event of failure of the position sensor.

7. The steering system of claim 1, wherein the first steering apparatus comprises a first outboard motor and the second steering apparatus comprises a second outboard motor.

8. The steering system of claim 1, wherein the first steering apparatus comprises a first rudder and the second steering apparatus comprises a second rudder.

9. The steering system of claim 1, wherein the first steering apparatus comprises a first sterndrive and the second steering apparatus comprises a second sterndrive.

10. The steering system of claim 1, wherein the first steering actuator is a first electric steering actuator and the second steering actuator is a second electric steering actuator.

11. The steering system of claim 2, wherein:
the first steering actuator is a first hydraulic steering actuator for steering the first steering apparatus;
the steering system further comprises a first hydraulic system comprising a first hydraulic pump for supplying pressurized hydraulic fluid to the first hydraulic steering actuator;
the second steering actuator is a second hydraulic steering actuator for steering the second steering apparatus;
the steering system further comprises a second hydraulic system having a second hydraulic pump for supplying pressurized hydraulic fluid to the second hydraulic steering actuator, the second hydraulic system being hydraulically independent of the first hydraulic system;
the control apparatus is an electronic pump control apparatus configured to control a hydraulic fluid output of the first hydraulic pump and hydraulic fluid output of the second hydraulic pump; and
the mechanical steering linkage operatively connects the first steering apparatus to the second steering apparatus so the first and second steering apparatuses are steered synchronously and one of the first and second hydraulic systems is capable of steering the first and second steering apparatuses where one of the hydraulic systems fails.

12. The steering system of claim 11, wherein the pump control apparatus is configured to control the first hydraulic pump and the second hydraulic pump so the hydraulic fluid outputs of the first and second hydraulic pumps are the same.

13. A steering system for a marine vessel, the steering system comprising:
a first steering apparatus having a first hydraulic steering actuator for steering the first steering apparatus;
a first hydraulic system comprising a first hydraulic pump for supplying pressurized hydraulic fluid to the first hydraulic steering actuator;
a second steering apparatus having a second hydraulic steering actuator for steering the second steering apparatus;
a second hydraulic system having a second hydraulic pump for supplying pressurized hydraulic fluid to the second hydraulic steering actuator, the second hydraulic system being hydraulically independent of the first hydraulic system;
an electronic pump control apparatus for controlling a hydraulic fluid output of the first hydraulic pump and hydraulic fluid output of the second hydraulic pump, wherein the pump control apparatus is configured to control the first hydraulic pump and the second hydraulic pump so the hydraulic fluid outputs of the first and second hydraulic pumps are the same; and
an electronic sensor operatively connected to the first hydraulic steering actuator and operatively connected to the pump control apparatus to provide feedback to the pump control apparatus.

14. The steering system of claim 13, wherein the second hydraulic steering actuator is operatively connected to the pump control apparatus and configured to provide feedback to the pump control apparatus in the event of failure of the electronic sensor of the first hydraulic steering actuator.

15. The steering system of claim 11, wherein the first steering apparatuses comprises a first outboard motor and the second steering apparatus comprises a second outboard motor.

16. The steering system of claim 11, wherein the first steering apparatus comprises a first rudder and the second steering apparatus comprises a second rudder.

17. A method of steering a marine vessel having a first steering apparatus with a first steering actuator for steering the first steering apparatus, a second steering apparatus having a second steering actuator for steering the second steering apparatus and a control apparatus, the method comprising:
operatively connecting the first steering apparatus to the second steering apparatus with a mechanical steering linkage so the steering apparatuses are steered synchronously;
providing a steering angle setpoint to the control apparatus; and
providing the same control command for both steering actuators from the control apparatus, whereby both of the actuators are steered the same amount;
wherein a steering angle feedback is sent to the control apparatus from a sensor on one of the steering apparatuses.

18. The steering system of claim 3, wherein the first hydraulic pump has a first DC electric motor, the second hydraulic pump has a second DC electric motor, and the control apparatus is configured to control the first and second hydraulic pumps via pulse width modulation of power supplied to the first and second DC electric motors.

19. The steering system of claim 12 further comprising an electronic sensor operatively connected to the first hydraulic steering actuator and being operatively connected to the pump control apparatus to provide feedback to the pump control apparatus.

20. The steering system of claim 13 further comprising a mechanical steering linkage operatively connecting the first steering apparatus to the second steering apparatus so the first and second steering apparatuses are steered synchronously and one of the first and second hydraulic systems is capable of steering the first and second steering apparatuses where one of the first and second hydraulic systems fails.

* * * * *